United States Patent [19]

Mayer et al.

[11] Patent Number: 5,276,261
[45] Date of Patent: Jan. 4, 1994

[54] PROCESS FOR THE PREPARATION OF TETRAFLUOROETHYLENE POLYMERS

[75] Inventors: Ludwig Mayer, Burghausen; Gernot Löhr, Burgkirchen, both of Fed. Rep. of Germany

[73] Assignee: Hoechst Aktiengesellschaft, Frankfurt am Main, Fed. Rep. of Germany

[21] Appl. No.: 982,873

[22] Filed: Nov. 30, 1992

[30] Foreign Application Priority Data

Dec. 2, 1991 [DE] Fed. Rep. of Germany ....... 4139665

[51] Int. Cl.$^5$ .............................. C08L 27/12
[52] U.S. Cl. .................... 524/546; 524/794; 524/795; 526/206
[58] Field of Search ............ 524/546, 794, 795; 526/206

[56] References Cited

U.S. PATENT DOCUMENTS

| | | | |
|---|---|---|---|
| 2,478,229 | 8/1949 | Berry | 524/546 |
| 2,534,698 | 12/1950 | Calfee | 526/206 |
| 2,593,582 | 4/1952 | Lontz et al. | 524/546 |
| 2,662,065 | 12/1953 | Berry | 524/794 |
| 2,881,142 | 4/1959 | Eldridge | 524/546 |
| 2,965,595 | 12/1960 | Brinker et al. | 526/206 |
| 3,012,996 | 12/1961 | McFarland | 526/206 |
| 3,105,824 | 10/1963 | Green et al. | 524/794 |
| 3,434,996 | 3/1969 | Salatiello et al. | 524/546 |
| 3,635,926 | 1/1972 | Gresham et al. | |
| 4,025,481 | 5/1977 | Tournut et al. | 526/206 |
| 4,052,278 | 10/1977 | Brown et al. | 524/546 |
| 4,186,121 | 1/1980 | Gangal | 526/206 |

FOREIGN PATENT DOCUMENTS

| | | | |
|---|---|---|---|
| 630402 | 11/1961 | Canada | 524/795 |
| 2052495 | 5/1971 | Fed. Rep. of Germany . | |
| 49-11746 | 3/1974 | Japan | 526/206 |
| 51-41085 | 4/1976 | Japan | 526/206 |

OTHER PUBLICATIONS

Hawley's Condensed Chemical Dictionary, Feb. 12, 1991 p. 797.

*Primary Examiner*—Joseph L. Schofer
*Assistant Examiner*—N. Sarofin
*Attorney, Agent, or Firm*—Connolly & Hutz

[57] ABSTRACT

1,1,1,2-Tetrafluoroethane is a good chain-transfer agent for the preparation of polymers of tetrafluoroethylene in aqueous colloidal dispersion.

5 Claims, No Drawings

PROCESS FOR THE PREPARATION OF TETRAFLUOROETHYLENE POLYMERS

The invention relates to a process for the preparation of colloidal dispersions of tetrafluoroethylene (TFE) polymers in aqueous medium in the presence of saturated fluorinated hydrocarbons with not more than 2 carbon atoms and at least 1 hydrogen atom, dispersants and free radical-producing initiators.

U.S. Pat. No. 2,965,595 discloses a process for the polymerization of TFE in aqueous medium to give colloidal high-molecular-weight polymers which is carried out in the presence of emulsifiers, water-soluble initiators and saturated fluorinated hydrocarbons with not more than 2 carbon atoms and at least 1 hydrogen atom. The polytetrafluoroethylene is said to be modified and the stability of the dispersion increased by this additive. Tetrafluoroethanes are not mentioned in this connection.

It is mentioned that the saturated fluorinated hydrocarbons may be basically chain-transfer agents or chain terminators, but in the process described there they are said to act as stabilisers and not as chain-transfer agents.

It has now been found that 1,1,1,2-tetrafluoroethane acts as a chain-transfer agent in such polymerization processes and has particular advantages in doing so. This compound is also known by the name "R134a". Surprisingly, it was furthermore found that isomeric 1,1,2,2-tetrafluoroethane is not in fact a chain-transfer agent, that is to say its addition has no effect on the molecular weight.

R134a is advantageously introduced in an amount of at least 2.5 mol %, preferably of at least 3 mol % to about 20 mol %, relative to the monomer(s). Larger amounts are not critical.

R134a is non-toxic, non-carcinogenic and non-teratogenic. It is non-inflammable and acts as an agent which renders other substances inert, due to its low chemical reactivity, and may thus inhibit deflagration during polymerization.

The dispersions are stabilised by R134a during polymerization, which is why less of the expensive emulsifier is required. In addition, the progress of the polymerization is improved so that a decrease in monomer take-up at the end of polymerization and the formation of micro-coagulates due to colloidal instability can be avoided. Thus the reaction time is shortened and the amount of coagulate and deposits is reduced. The formation of agglomerates during polymerization, which may lead to explosions, is thus avoided.

A particular advantage is that no branches are formed in the polymeric molecule and that the molecular weight may be adjusted in a controlled fashion. Therefore products are obtained with a narrow molecular weight distribution, which in turn leads to a considerably reduced tendency to swell during extrusion.

The addition of other chain-transfer agents or anti-coagulants is not required, but is not excluded.

According to the invention, homo- and copolymers of TFE may be prepared. Suitable comonomers are perfluorinated olefinic compounds, for example perfluoroalkenes such as hexafluoropropene, or perfluoro(alkylvinyl) ethers such as in particular n-perfluoropropylperfluorovinyl ether. Polymerization to give aqueous colloidal dispersions is performed in a manner known per se. Preferred temperatures are from 40° to about 100° C., especially from 55° to 80° C., and preferred pressures are from 4 to 30 bar, especially from 8 to 20 bar.

The dispersants used are the surface-active, fluorinated compounds which are conventionally used for the dispersion polymerization of fluorinated olefins to give aqueous, colloidal dispersions. Such fluorinated emulsifiers are in particular compounds of the general formula Y—Rf—Z—M, in which Y=H, Cl or F;
Rf=the group $C_aF_{2a}$, in which a=5 to 10, or the group

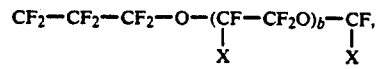

in which X=F or $CF_3$ and b=0 to 3;
Z=the group COO or $SO_3$; and
M=an alkali metal or —N(R)$_4$, where R is hydrogen or an alkyl radical with 1 to 2 carbon atoms.

The ammonium salts of perfluorooctanoic acid and perfluorooctanesulfonic acid are preferred. Mixtures of the emulsifiers mentioned may also be used. These emulsifiers should be present in a concentration of 0.06 to 1.0% by weight, preferably of 0.1 to 0.6% by weight, relative to the aqueous polymerization medium.

The polymerization is started in the presence of free radical-producing initiators. Suitable free radical producers are either hard high-energy irradiation or water-soluble, free radical-producing initiators, such as are well-known to persons skilled in the art for the polymerization and copolymerization of TFE. Such initiators are in particular peroxide compounds. Merely by way of example, mention may be made here of hydrogen peroxide, sodium or barium peroxide, diacyl peroxides such as for example diacetyl peroxide, dipropionyl peroxide, dibutyryl peroxide, dibenzoyl peroxide, benzoyl acetyl peroxide, disuccinic acid peroxide, diglutaric acid peroxide, and dilauroyl peroxide, furthermore water-soluble peracids such as peracetic acid and their water-soluble salts (especially ammonium, sodium and potassium salts) or their esters, such as for example tert.-butyl peroxyacetate and tert.-butyl peroxypivalate. Water-soluble salts, especially ammonium, potassium and sodium salts, of other peracids, such as peroxymono- and peroxydisulfuric acid and also of perphosphoric acid, may also be used. Furthermore, perfluoroacyl peroxides or ω-hydrofluoroacyl peroxides are suitable. Water-soluble azo compounds represent another group of initiators which may be used. Suitable customary redox systems which may be mentioned merely by way of example are combinations of peroxodisulfate and hydrogen sulfite or disulfite, of peroxodisulfate and thiosulfate and of peroxodisulfate and hydrazine or azodicarboxylic acid amide (salts preferably in the form of the alkali metal salts and especially the ammonium salts). Furthermore, the ammonium, alkali metal or alkaline earth salts of permanganic acid, manganic acid or manganous acid may be used to advantage.

The amount of initiator added is between 0.03 and 2% by weight, preferably between 0.05 and 1% by weight, relative to the total amount by weight of the monomers used. The total amount of initiator may be added to the polymerization liquor at the start of reaction. In the case of relatively large batches, however, it may be expedient to add the initiator continuously over the course of polymerization up to a conversion of 70 or 80%. Likewise, some of the initiator may be introduced at the start and the remainder added subsequently either all at once or in portions. The addition of accelerators, for example of soluble iron, copper and silver salts, may be of advantage, especially when using redox systems as initiators.

The invention is explained in more detail in the following examples. Percentages are by weight unless otherwise stated.

EXAMPLE 1

118 l of deionized water are placed in an internally enameled polymerization reactor with a total volume of 195 l, provided with an impeller agitator, and 185 g of ammonium perfluorooctanoate (30% strength in water) are dissolved therein. After sealing the reactor, it is first flushed five times with nitrogen and then once with 1.0 bar of TFE.

After releasing the pressure and heating to 68° C., 4 bar of R134a and 420 g perfluoro-n-propylperfluorovinyl ether (PPVE) are pumped in via a pipe, with moderate stirring. The rate of stirring is then increased to 170 rpm. Then TFE is fed into the reactor via the gas phase until the total pressure reaches 13.4 bar, whereupon the polymerization is started by pumping in 10.5 g of ammonium persulfate dissolved in 300 ml of deionized water.

As soon as the pressure starts to fall, further TFE and PPVE are added via the gas phase in accordance with consumption, so that the total pressure of 13.4 bar is maintained. The heat released is removed by cooling of the reactor wall and the temperature is maintained at 68° C. in this way.

After feeding 35.7 kg TFE into the reactor, the introduction of monomer is stopped, the pressure is released and the reactor is rinsed several times with $N_2$. The 152.7 kg of polymer dispersion with a solids content of 22.3% which is obtained is drained from the bottom of the reactor. After transferring to an internally enameled 500 l stirring vessel, the dispersion is diluted with 50 l of deionized water, treated with 0.8 l of concentrated hydrochloric acid and stirred until the solid has separated from the aqueous phase. The flocculent powder is granulated with 404 g of 1,1,2-trichlorotrifluoroethane (F113) and then washed six times, with 300 l of deionized water each time, with vigorous stirring. After the addition of 150 l of deionized water, the F113 is driven out with steam. The moist powder is dried for 16 hours at 290° C. in a drying cabinet under an atmosphere of nitrogen. 35.9 kg of a bipolymer is thus obtained, having a PPVE content of 3.4 mol % and a melt-flow index (MFI, determined according to DIN 53 735: weight 5 kg, 372° C.) of 1.6.

EXAMPLE 2

The procedure is as in Example 1, but 7 bar of R134a and 310 g of PPVE are pumped in. A bipolymer is thus obtained with a PPVE content of 3.1 mol % and an MFI of 4.8.

EXAMPLE 3

The procedure is again as in Example 1, but 11 bar of R134a and 250 g of PPVE are pumped in and a bipolymer with a PPVE content of 3.7 mol % and an MFI of 10.1 is obtained.

EXAMPLE 4

The procedure again corresponds to that in Example 1, but 6 bar of R134a and no PPVE are pumped in. The TFE is introduced up to a final pressure of 12 bar. A polytetrafluoroethylene micropowder with an MFI of 0 to 0.5 is obtained.

We claim:
1. A process for the preparation of a colloidal dispersion of a polymerisate of tetrafluoroethylene, which comprises polymerizing tetrafluoroethylene and optionally a comonomer in an aqueous medium containing a dispersant, a radical-forming initiator and 1,1,1,2-tetrafluoroethane.

2. The process as claimed in claim 1, wherein at least 2.5 mol % of 1,1,1,2-tetrafluoroethane, referred to the tetrafluoroethylene and optional comonomer, are added to the aqueous medium.

3. The process as claimed in claim 2, wherein the amount of 1,1,1,2-tetrafluoroethane is 3 to 20 mol %.

4. The process as claimed in claim 1, wherein the 1,1,1,2-tetrafluoroethane is added to the aqueous medium before the tetrafluoroethylene is introduced.

5. The process as claimed in claim 1, wherein the polymerisate of tetrafluoroethylene is a copolymer comprising a further perfluoroalkene or a perfluoro(alkylvinyl) ether.

* * * * *